(12) United States Patent
Pfeifer et al.

(10) Patent No.: US 7,431,987 B2
(45) Date of Patent: Oct. 7, 2008

(54) CORE-SHELL PARTICLES HAVING NON-POLAR OUTER SURFACE AND METHODS FOR PRODUCING A THREE-DIMENSIONAL OBJECT FROM THE PARTICLES

(75) Inventors: Rolf Pfeifer, Sindelfingen (DE); Jialin Shen, Bernstadt (DE)

(73) Assignee: Daimler AG, Stuttgart (DE)

( * ) Notice: Subject to any disclaimer, the term of this patent is extended or adjusted under 35 U.S.C. 154(b) by 225 days.

(21) Appl. No.: 10/518,698

(22) PCT Filed: Jun. 16, 2003

(86) PCT No.: PCT/DE03/02013

§ 371 (c)(1),
(2), (4) Date: Dec. 12, 2005

(87) PCT Pub. No.: WO03/106148

PCT Pub. Date: Dec. 24, 2003

(65) Prior Publication Data

US 2006/0103054 A1    May 18, 2006

(30) Foreign Application Priority Data

Jun. 18, 2002 (DE) .......................... 202 20 325 U
Mar. 26, 2003 (DE) .......................... 203 08 744 U

(51) Int. Cl.
*B32B 5/16* (2006.01)
*B05D 1/06* (2006.01)
*B05D 1/36* (2006.01)
*B05D 7/00* (2006.01)
*B22F 3/11* (2006.01)

(52) U.S. Cl. .................. 428/403; 428/323; 427/180; 427/201; 427/203; 427/474; 427/595; 419/2

(58) Field of Classification Search ................. 428/403; 419/2; 427/180, 201, 203, 474, 595
See application file for complete search history.

(56) References Cited

U.S. PATENT DOCUMENTS

| 3,935,339 A | * | 1/1976 | Cooke, Jr. ................ 427/216 |
| 5,204,055 A | | 4/1993 | Sachs et al. |
| 5,229,209 A | * | 7/1993 | Gharapetian et al. ........ 428/403 |
| 6,485,831 B1 | * | 11/2002 | Fukushima et al. ......... 428/403 |

FOREIGN PATENT DOCUMENTS

| JP | 06-218712 A | 8/1994 |
| JP | 07-502938 | 3/1995 |
| JP | 2003-507120 A | 2/2003 |
| WO | WO 92/10343 A1 | 6/1992 |
| WO | WO 01/13814 A1 | 3/2001 |

* cited by examiner

*Primary Examiner*—H. T Le
(74) *Attorney, Agent, or Firm*—Patent Central LLC; Stephen A. Pendorf

(57) ABSTRACT

The invention relates to particles for producing a three-dimensional object by using layer-building methods (powder-based generative rapid prototyping methods), to methods for producing a three-dimensional object therefrom, and to an object that can be produced by using the particles or the methods. The aim of the invention is to improve the precision of production methods of this type by preventing the tendency of the particles used to agglomerate. To this end, a surfactant layer is applied, whereby the nonpolar groups of the surfactants are oriented toward the particle surface thus forming a hydrophobic surface having a low tendency to agglomerate.

4 Claims, 1 Drawing Sheet

US 7,431,987 B2

CORE-SHELL PARTICLES HAVING NON-POLAR OUTER SURFACE AND METHODS FOR PRODUCING A THREE-DIMENSIONAL OBJECT FROM THE PARTICLES

CROSS REFERENCE TO RELATED APPLICATION

This application is a national stage of PCT/DE 03/02013 filed 16 Jun. 2003 and based upon DE 202 20 325.5 filed 18 Jun. 2002 and DE 203 08 744.5 filed Mar. 26, 2003 under the International Convention.

BACKGROUND OF THE INVENTION

1. Field of the Invention

The invention relates to particles for producing a three-dimensional object by means of layer-building processes (powder-based generative rapid prototyping processes), to processes for producing a three-dimensional object therefrom, and to an object producible using the particles or the processes.

2. Related Art of the Invention

Powder-based generative rapid prototyping processes are known, for example, under the names 3D laser sintering or 3D printing.

The process known as 3D printing is a process for producing a three-dimensional object in which first of all a layer of particles is applied to a target surface, and then selected parts of the layer, corresponding to a cross-section of the object, are printed with a liquid in which the particles are at least partially (superficially) soluble, in such a manner that the particles are joined to one another in the selected parts. Then, the application and printing steps are repeated to build up a plurality of layers, so that the joined parts of the adjacent layers are joined together in order to form the object.

A 3D printing process of this type is known, for example, from European Patents EP 0 644 809 B1, EP 0 686 067 B1.

3D printing processes which join the particles by partially dissolving them with the binder liquid have the drawback that the finished object is subject to significant shrinkage compared to the region of the particle layer which was originally printed with the binder liquid. The reason for this is that partially dissolved particles which are in contact with one another move closer together under the influence of their surface tension, so that a more tightly packed arrangement is present after drying of the binder liquid than before. This effect cannot readily be suppressed, and is indeed necessary to a certain extent in order to achieve sufficiently strong cohesion of the particles in the finished object. However, one serious disadvantageous consequence of this effect is that in the case of an object produced using a process of this type which exceeds a certain maximum size, the shrinkage during the drying process can lead to deformation or crack formation.

To combat this problem, 3D binder printing processes have been developed in which the binder liquid contains additives (sintering aids) which remain behind in the printed regions of the layer after the liquid has dried and make it possible to join the particles in the wetted regions by the entire mass of particles which has been processed, including the regions which have not been printed, being heated in such a way that the particles in the printed regions sinter together under the influence of the sintering aid, but the particles which have remained unprinted do not sinter together.

One problem of this technique is that the sintering aids used are generally of a mineral type and are at best dispersible but not soluble in the binder liquid, which means that they cause considerable wear to the spray nozzles used to wet the granulated material.

A further problem of the known 3D binder printing processes is that as a result of agglomeration of the particles used, objects produced thereby tend to have a non-uniform, rough surface profile which does not precisely correspond to the profile of the printed regions.

The process known as 3D laser sintering is very similar to 3D printing. The only difference is that the printing with the binder liquid is replaced by irradiating with an energy beam which superficially softens or melts the particles and thereby joins them. A process of this type is known, for example, from DE 690 31 061 T2.

DE 103 13 452 A1, which was published after the priority date of the present application, has already proposed coated particles having advantageous properties for 3D laser sintering, the coating of which particles may also be hydrophilic. Particles of this type, as a result of taking up water from the air, tend to agglomerate in an undesirable way, a phenomenon which should be avoided in order to ensure component production which is as accurate as possible.

SUMMARY OF THE INVENTION

It is an object of the invention to provide particles for producing a three-dimensional object by means of layer-building processes which avoid one or more of the drawbacks listed above, as well as processes for producing a three-dimensional object therefrom and an object producible using the particles or the processes.

The object is achieved firstly by particles for producing a three-dimensional object by means of layer-building processes.

First of all, a polar intermediate layer, for example polymethacrylate or polyvinyl acetal, is applied to cores of any desired material, e.g. metal, ceramic or plastic, and then a surfactant layer is applied to the polar intermediate layer. The surfactants are forced to arrange themselves on the polar intermediate layer in such a manner that their polar groups face toward the intermediate layer and the nonpolar groups face outward. Coated particles of this type have a hydrophobic surface and therefore do not take up any water from the environment. This results in good flow properties and a significant reduction in the tendency to agglomerate.

Therefore, the particles according to the invention can be used to produce objects with a smoother surface than when using a conventional granulated material, or objects with finer, more detailed structures can be produced using the same particle size compared to conventional particles.

If the intermediate layer is relatively thick (0.1 to 10 percent of the particle radius), a second benefit, which is independent of the polarity of the surface layer, is achieved. Specifically, on account of the intermediate layer and the material below it having different chemical-physical properties, it is possible to restrict the partial fusion of the particles, which is required to produce a solid object from the particles, to the intermediate layer and therefore, depending on the ratio of the thickness of the intermediate layer to the material below it, to limit the shrinkage. This applies both to 3D printing and to 3D laser sintering.

Thicknesses of the surface layer in the range from 0.1 to 10% of the mean particle radius have proven suitable for this purpose.

Polyvinylpyrrolidones and acrylic polymers have proven particularly suitable materials for an intermediate layer of this type.

The surface layer of the particle consists of surfactant. Surfactants are generally characterized in that they combine polar and nonpolar groups in one molecule, so that they are able to make nonpolar substances soluble in polar solvents or vice versa on account of the fact that the polar group in each case accumulates at the polar substance and the nonpolar group accumulates at the nonpolar substance. In this case, the thickness of the surfactant layer corresponds as accurately as possible to one monolayer, so that the polar groups of the surfactant molecules are as far as possible all directed toward the interior of the particles but the nonpolar groups of the surfactant molecules are all directed outward and thereby form the uniformly nonpolar outer surface of the particle.

The surfactant may be any surfactant which is known from the field of detergents, cleansing agents or body-care agents. Anionic surfactants (e.g. fatty alcohol sulfates, alkylbenzene sulfates), cationic surfactants (e.g. tetraalkylammonium salts), nonionic surfactants (e.g. fatty alcohol polyglycol ethers or alkyl polyglycosides) or amphoteric surfactants are suitable. By way of example, mention may be made of sodium lauryl sulfate or betaine.

The surfactant and intermediate layer are expediently selected in such a way that there is a solvent in which the surfactant is soluble but the intermediate layer is not. This means that it is possible for the intermediate layer to be applied to the particles first of all using known processes (e.g. spray drying) and then for the surfactant layer to be applied on top of it by the particles provided with the intermediate layer being brought into contact with a very dilute solution of the surfactant and being dried through evaporation of the solvent. The strong dilution of the solution ensures that only a monomolecular layer of surfactant is formed on the surface of the intermediate layer.

In the embodiment explained above, the particles may have a core of metal, ceramic or polymer material. The core and coating materials, for the particles to be used in a 3D printing process, should expediently be selected in such a way that a solvent exists which dissolves the surface layer and the intermediate layer but not the core. A solvent of this type can be used as binder liquid in the subsequent 3D printing process. Although this binder liquid partially dissolves the layers surrounding the core and thereby allows the layers of adjacent particles to fuse together, since it does not attack the core itself, the shrinkage caused by the fusion is reduced to an extent which is at most proportional to the ratio of the radius of the core to the thickness of the surface layer and if appropriate of the intermediate layer.

Correspondingly, if the particles are used for a 3D laser sintering process, the core and coating materials should be selected in such a way that the softening point of the core is well above that of the layers above it, so that even with joining of this type the fusion of the particles is restricted to the upper layers and therefore the shrinkage is minimized. It is particularly advantageous, although not necessary, to use a material with a low softening point, preferably <70° C., for the production of the intermediate layer. The use of particles which have been coated in this way allows the process temperature to be reduced and therefore allows the shrinkage to be lowered further.

BRIEF DESCRIPTION OF THE DRAWING

Further features and advantages of the present invention will emerge from the following description of exemplary embodiments and also from FIG. 1.

DETAILED DESCRIPTION OF THE INVENTION

Figure 1:
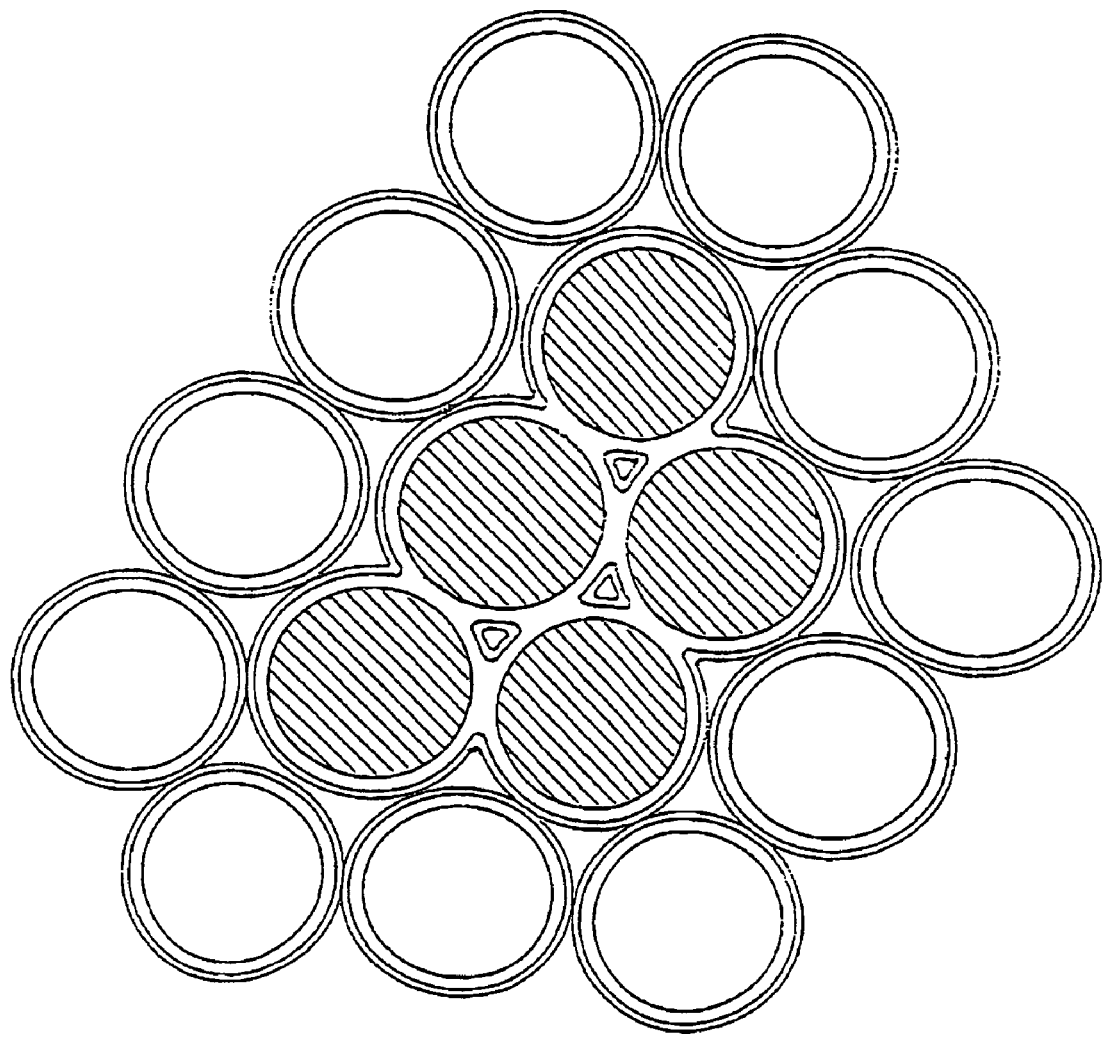
FIG. 1: Shows particles which have been joined after printing or irradiation (in hatched form) surrounded by unjoined particles. The intermediate layer and surfactant layer are illustrated in thickened form to improve the clarity of the illustration.

According to a first embodiment of the invention, a particle is in the form of a sphere. However, it will be understood that it may also take a form which deviates from the shape of a sphere, for example ellipsoidal or irregular form. The particle has a core of a polymer material, in this case of polymethyl methacrylate (PMMA), which is surrounded by an intermediate layer formed from polyvinylpyrrolidone (PVP). This material forms a polar, hydrophilic outer surface. Suitable polyvinylpyrrolidones are marketed under the names Luviskol and Luvitec by BASF; an acrylic polymer marketed under the name Bellac by Belland AG is also suitable.

The intermediate layer is produced by dissolving the polyvinylpyrrolidone in an aqueous medium, applying the solution to the particles and drying the particles. The solvent used in this case is preferably water, since this has the advantage of evaporating without leaving any residues. (However, ethanol or an aqueous ethanol solution is also suitable.) For the coating operation, the particles are fluidized in a fluidized bed by a hot airstream and are simultaneously sprayed with the solution. Drops of the solution which come into contact with particles and surround the latter evaporate in the hot airstream, with the result that the dissolved polyvinylpyrrolidone remains behind and forms the intermediate layer. The resulting layer thickness can be controlled using the concentration of the solution/suspension/dispersion used and the duration of the treatment, as well as the temperature in the fluidized bed.

Alternatively, it is also possible to apply an intermediate layer of the acrylic polymer Bellac by the latter being dissolved in a basic aqueous medium with a pH of at least 10.

The surface layer formed from the surfactant sodium lauryl sulfate is produced in a similar way to the intermediate layer of PVP by spraying the particles, which have been fluidized in the fluidized bed, with a second solution which is a very dilute solution of the surfactant in acetone. Since PVP is not soluble in acetone, the intermediate layer consisting of this compound is not attacked in this second coating operation. In the case of an intermediate layer formed from the basic-soluble Bellac, by contrast, a dilute aqueous surfactant solution with a pH not exceeding 9.5 is used. This does not attack the Bellac layer. On account of the highly dilute nature of the surfactant solution, only a monomolecular surfactant layer is formed on the intermediate layer of PVP or Bellac, and the nonpolar groups of this surfactant layer are uniformly facing outward, thereby producing nonpolar particles with little tendency to agglomerate and good flow properties.

To produce an object from particles of this type, a layer of these particles is placed on a base and sprayed from above with a binder liquid in accordance with a predetermined pattern. For this spraying operation, it is possible to use an appliance similar to a generally known ink-jet printer; appliances of this type are described in the European patents referred to in the introduction and are not explained in more detail here.

Suitable binder liquids are basic aqueous solutions, such as for example ammonia solution, which were also used for depositing the intermediate layer of Bellac, since they dissolve both intermediate layers and the surfactant layer but not the PMMA core. To set a desired viscosity of the binder liquid, it is possible, for example, to add glycol.

Printing parts of the particle layer with the binder liquid at least partially dissolves the surface layer and the intermediate layer but not the core which they enclose. The binder liquid is evaporated/vaporized, and the joined-together coatings together with the cores which they enclose remain behind, so that the previously separate particles form a cohesive body; cf. in this respect the joined, hatched particles in FIG. 1. In the area surrounding this region, which has not been affected by the binder liquid, the particles remain separate, in unchanged form.

Repeated application of a layer of particles to the previous layer and printing of regions of the new layer with binder liquid in accordance with a predetermined pattern, which may vary from layer to layer, ultimately produces a cohesive body formed from joined particles, from which it is then merely necessary to remove the surrounding particles which have remained separate.

Since the basic aqueous ammonia solution used as binder liquid does not dissolve the PMMA cores of the particles, their original form remains unchanged in the finished object, and consequently the shrinkage of the finished object can be no stronger than the ratio of the thickness of the intermediate layer to a mean radius of the cores of the particles. This thickness may, for example, amount to 0.5 µm for a mean radius of approx. 10 µm.

The nonpolar nature of the outer surfaces of the particles makes the powder insensitive to atmospheric humidity and thereby prevents agglomeration of the particles. It therefore ensures the formation of uniform spaces between the unjoined particles and accordingly also ensures a uniform propagation of binder liquid which is sprayed on. Consequently, the surfaces of the object obtained are uniformally smooth and accurately follow the predetermined pattern of the distribution of the binder liquid.

In an exemplary embodiment for 3D laser sintering, the particles have a core of polymethyl methacrylate (PMMA), which is surrounded by an intermediate layer with a low softening point (<70° C.), in this case a poly(ethylene glycol) amine or —amide. This material forms a polar, hydrophilic outer surface. Suitable poly(ethylene glycol)amines or —amides are listed in known databases, such as BEILSTEIN or GMELIN.

The intermediate layer is produced by dissolving the poly(ethylene glycol)amine in methanol, applying the solution to the particles and drying the particles. Other suitable solvents are tertiary butyl methyl ethers or ethyl acetate, each likewise with low boiling points. For the coating operation, the particles are fluidized in a fluidized bed by an airstream and are simultaneously sprayed with the solution. Drops of the solution which come into contact with particles and surround them evaporate in the airstream, with the dissolved poly(ethylene glycol)amine remaining behind and forming the intermediate layer. The resulting layer thickness can be controlled using the concentration of the solution used and the duration of the treatment.

The surface layer formed from the surfactant sodium lauryl sulfate is produced in a similar way to the intermediate layer by spraying the particles which have been fluidized in the fluidized bed with a second solution, which is a highly dilute solution of the surfactant in a relatively long-chain alcohol, e.g. ethanol or propanol. Since poly(ethylene glycol)amine is not soluble in relatively long-chain alcohols, the intermediate layer consisting of this material is not attacked in this second coating operation. On account of the highly dilute nature of the surfactant solution, after evaporation of the solvent only a monomolecular surfactant layer is formed on the intermediate layer, and the nonpolar groups of this surfactant layer are uniformally directed outward, thereby producing nonpolar particles with little tendency to agglomerate and good flow properties.

To produce an object from particles of this type, a layer of these particles is placed on a base and irradiated from above with a laser beam in, accordance with a predetermined pattern, corresponding to a cross-section of the object, so that the particles are joined in the selected part. Then, the application and irradiation steps are repeated for a plurality of layers, so that the joined parts of the adjacent layers are joined together in order to form the object. A process of this type and a suitable apparatus are known, for example, from DE 690 31 061 T2 and are not explained in more detail at this point.

Since the softening point of the PMMA cores of the particles, at approx. 124° C., is significantly higher than that of poly(ethylene glycol)amine, at approx. 60° C., the original form of these cores is retained unchanged in the finished object if the introduction of laser energy is suitably restricted, with the result that the shrinkage of the finished object can be scarcely any greater than the ratio of the thickness of the intermediate layer to a mean radius of the cores of the particles. This thickness may, for example, be 0.5 µm for a mean radius of approx. 10 µm. The softening point of the surfactant monolayer is of no importance on account of its low thickness and the associated minimal absorption of energy.

The nonpolar nature of the outer surfaces of the particles prevents agglomeration of the particles before the softening of the (surface and) intermediate layer and thereby ensures uniform spaces between the unjoined particles and accordingly also ensures a uniform introduction of energy from the laser beam into the layer of particles. Consequently, the surfaces of the object obtained are uniformly smooth and accurately follow the predetermined pattern of the laser irradiation.

The invention claimed is:

1. A particle for producing a three-dimensional object by means of layer-building processes, comprising a core of at least a first material, a first coating on the core with a second material, which is polar, and a second coating on the first coating, wherein the thickness of the first coating corresponds to 0.1 to 10% of the mean particle radius, wherein the second coating is formed from surfactant, the thickness of which corresponds to a monolayer of the surfactant, and wherein a uniformly non-polar outer surface of the particle is formed.

2. The particle as claimed in claim 1, wherein the first coating and the second coating are soluble in water or an aqueous solution but the core is not.

3. A process for producing a three-dimensional object, including the following steps:

applying a layer of particles according to claim 1 to a target surface, irradiating a selected part of the layer, corresponding to a cross-section of the object, with an energy beam, so that the particles are joined in the selected part, repeating the application and irradiation steps for a plurality of layers, so that the joined parts of the adjacent layers are joined together in order to form the object.

4. A process for producing a three-dimensional object, including the following steps:

applying a layer of particles according to claim 1 to a target surface, printing a liquid in which at least parts of the particles are soluble onto a selected part of the layer, corresponding to a cross-section of the object, so that the particles are joined in the selected part, repeating the application and printing steps to form a plurality of layers, so that the joined parts of the adjacent layers are joined together in order to form the object.

* * * * *